United States Patent [19]

Friedman

[11] 3,938,593
[45] Feb. 17, 1976

[54] PROCESS FOR TREATMENT OF WELLS WITH ACID HALIDES

[75] Inventor: Robert H. Friedman, Houston, Tex.

[73] Assignee: Getty Oil Company, Los Angeles, Calif.

[22] Filed: Mar. 11, 1974

[21] Appl. No.: 449,771

[52] U.S. Cl. .............................. 166/307; 252/8.55 C
[51] Int. Cl.² ........................................ E21B 43/27
[58] Field of Search .......... 166/307, 271, 304, 281, 166/282, 259; 252/8.55 C

[56] References Cited
UNITED STATES PATENTS

| | | | |
|---|---|---|---|
| 2,059,459 | 6/1936 | Hund et al. | 166/307 |
| 2,206,187 | 6/1937 | Herbsman | 252/8.55 C |

FOREIGN PATENTS OR APPLICATIONS

| | | | |
|---|---|---|---|
| 570,024 | 5/1954 | Canada | 166/307 |

OTHER PUBLICATIONS

Morrison et al., Organic Chemistry, 2nd Edition, 1966, Allyn and Bacon, Inc., pp. 666, 659 and 660.

*Primary Examiner*—Stephen J. Novosad
*Assistant Examiner*—George A. Suckfield
*Attorney, Agent, or Firm*—Arnold, White & Durkee

[57] ABSTRACT

Methods are provided for acidization of wells which are particularly useful in deep high-temperature oil and gas wells. The methods include injection of an acid halide which upon reaction with water in situ in the subterranean formation surrounding the well forms two acids, one of which is a halogen acid.

10 Claims, No Drawings

PROCESS FOR TREATMENT OF WELLS WITH ACID HALIDES

BACKGROUND OF THE INVENTION

This invention relates generally to wells such as oil and gas wells and especially to chemical treatment of such wells and the subterranean formations surrounding such wells. More particularly, the invention relates to the type of chemical treatment known in the art as "acidization."

Acidization of wells is a well known process for increasing or restoring the permeability of subterranean formations and thereby facilitating the flow of well fluids such as oil or gas into the well, and also facilitating the injection of fluids into the formation from the well if such is desired.

Acidization, as the term implies, generally consists of treating the formation with an acid, usually hydrochloric acid. The acid is effective to dissolve certain clogging deposits such as carbonate to open pores and other flow channels thereby increasing, sometimes remarkably, the permeability of the formation.

Many different acidizing procedures have been suggested in the prior art to cope with many different well conditions and special formation or well problems. But one condition which has continued to present a special problem is the extreme high temperatures present in many formations, especially in connection with very deep wells. In recent years more and more very deep high temperature wells have been drilled. Acid is much more reactive at increased temperatures. Generally, acid reactivity doubles with an increase of eighteen fahrenheit degrees. Thus, at 300°F the reactivity of an acid may be about 4000 times what it is at 80°F.

In any acidization process, a problem exists in protecting well equipment such as tubing and casing from corrosion by the acid. For this purpose, corrosion inhibitors are generally added to the acid solution prior to injection of the solution into the borehole. But it is difficut to find inhibitors which are effective at very high temperatures. And the expense of the inhibitor additives, which may be significant even for the types and amounts required at low temperatures, may be prohibitive at very high temperatures.

Another difficulty with inhibitors, especially in the quantities necessary in high temperature wells, is their tendency to form insoluble solids upon reaction with certain formation materials, thereby causing damage to the formation.

This invention provides an effective acidization method which avoids the above-mentioned problems and yet provides significant increases in permeability. The methods provided are especially useful in high temperature wells but may also be useful in other contexts of use.

SUMMARY OF THE INVENTION

The invention provides methods for acidizing wells particularly useful in deep high-temperature wells.

In its broadest aspects, the invention contemplates first drying the borehole, and then injecting into the borehole at pressures not significantly greater than necessary to overcome formation pressure, an acid halide which upon reaction with water in situ forms two acids. One of the two acids formed is a halogen acid, preferably hydrochloric acid. The other may desirably be acetic acid.

Applicant's specific preferred embodiment contemplates the use of acetyl chloride as the acid halide, which upon reaction with water yields hydrochloric and acetic acids. Mixtures of hydrochloric and acetic acids have been found to have superior properties for acidization.

DETAILED DESCRIPTION OF PREFERRED EMBODIMENTS

In accordance with the invention, compositions of acid halides are provided which are effective to form acid mixtures in the formation by reaction with water in situ.

The acid halides utilized may be generally described by the formula

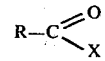

where R is preferably a methyl group but may be any suitable hydrocarbon group such as ethyl, propyl or butyl, and X is a halogen (chlorine, bromine, fluorine, or iodine).

In accordance with the embodiment of the invention preferred by applicant at the time of this application which represents the best mode hereof, the well conduit (such as tubing) is first dried in a suitable manner as by injecting a suitable quantity (e.g., depending on the depth of the well and the size of the tubing, about 2 barrels) of a drying agent such as acetone therethrough.

If there is believed to be insufficient water at proper areas of the formation for forming adequate quantities of acid, water may be injected into the formation prior to drying the tubing. It is believed, however, that in most formations this preliminary step will be unnecessary since sufficient water generally exists in the formation.

Following drying of the conduit, the suitable acid halide which will form two acids after reaction with the water in situ is then injected in the absence of a corrosion-inhibiting additive, through the conduit. One of these acids will be a halogen acid, preferably hydrochloric acid. The other is preferably acetic acid, which complements the acidization process. It has been found that mixtures of hydrochloric and acetic acids have superior properties for acidization.

Thus, the preferred acid halide provided is acetyl chloride, $CH_3COCl$.

It may be desired in some contexts of use, in order to form acetic-hydrochloric mixtures richer in hydrochloric acid, to inject some dry gaseous hydrochloric acid along with the acid halide. However, the amount of hydrochloric acid injected must be such, and the gas must be dry, so as not to create the corrosion problems mentioned earlier in this specification.

The amount of acid halide injected will depend on the volume of the formation to be treated and the extent to which acidization of the formation is desired. Applicant believes that it will be suitable to employ an amount of halide generally equivalent to the amount of hydrochloric acid used in present acidizing processes which utilize 15 percent HCl. Laboratory tests which have proven quite satisfactory have employed between about 0.1–0.4 pore volume based on the region to be treated. (The volume of the region to be treated is assigned a value of 1.0 for purposes of this discussion and the following example.)

It may be desirable as another embodiment to alternate injection of water and halide into the well, drying the well conduit before each injection of halide.

The following example demonstrates the permeability improvement found through laboratory experiments.

EXAMPLE

A laboratory test was made using a core of Austin Chalk limestone two inches long and one and one-half inches in diameter, in an epoxy cannister.

The core was first saturated with about ten pore volumes of deionized water and the initial permeability was measured at 5.22 millidarcies.

Five milliliters of acetyl chloride (about 0.2 pore volume) were then injected into the core. The permeability of the core was then measured at 1370 millidarcies. The ratio of permeability after treatment with acetyl chloride to initial permeability was thus 274.

The example was conducted at ambient temperature and pressure conditions.

It is not contemplated that any abnormal pressures will be employed in the injection of the halide into the well bore, although such conditions may be altered depending on the circumstances of the particular well. But pressures on the order of those necessary for fracturing of the formation are not presently contemplated.

Although, as illustrated by the preceeding example, the process of the invention may be performed at ambient or other relatively low temperature, the invention is expected to find its primary utility at the much higher temperatures found usually in very deep wells. This is true since a key feature of the invention is the fact that the process does not require the use of a corrosion-inhibiting additive.

Another advantage of the invention is provided by the in situ reaction utilizing in most situations connate water. This allows the process to be effective in areas remote from the borehole.

Still another advantage of the invention is provided by the mixture of two acids formed upon reaction with water, which mixture provides superior acidization reaction.

Although the invention has been described in terms of preferred embodiments, it will be apparent to those of skill in the art that modifications may be made in the methods indicated without departure from the scope of the invention as defined by the following claims.

What is claimed is:

1. A process for chemical treatment of wells comprising:
   providing an acidizing composition which includes an acid halide of the formula

where X is a halogen and R is selected from the group consisting of methyl, ethyl, propyl and butyl;
   injecting said composition through the well bore, into the subterranean formation surrounding the well;
   said composition reacting with the water in situ in said formation to form a mixture of two acids, RCOOH and HX, which mixture is effective to chemically react with formation materials to increase the permeability of the formation.

2. The process in accordance with claim 1 wherein said acid halide is acetyl chloride.

3. A process for chemical treatment of high-temperature wells comprising:
   providing an acidizing composition which includes an acid halide of the formula

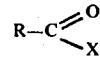

where X is a halogen and R is selected from the group consisting of methyl, ethyl, propyl and butyl;
   injecting said composition through the well bore, in the absence of a corrosion-inhibiting additive, into the subterranean formation surrounding the well bore;
   said composition reacting with the water in situ in said formation to form a mixture of two acids, RCOOH and HX, which mixture is effective to chemically react with formation materials to increase the permeability of the formation.

4. The process in accordance with claim 3 wherein said acid halide is acetyl chloride.

5. A process for chemical treatment of wells having a conduit therein comprising:
   providing an acidizing composition which includes an acid anhydride of the formula

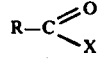

where X is a halogen and R is selected from the group consisting of methyl, ethyl, propyl and butyl;
   injecting a suitable drying agent through said well conduit to dry said conduit;
   injecting said composition through the well conduit, into the subterranean formation surrounding the well;
   said composition reacting with the water in situ in said formation to form a mixture of two acids, RCOOH and HX, which mixture is effective to chemically react with formation materials to increase the permeability of the formation.

6. The process in accordance with claim 5 wherein said acid halide is acetyl chloride.

7. A process for chemical treatment of wells having a conduit therein comprising:
   providing an acidizing composition which includes an acid halide of the formula

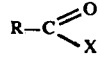

where X is a halogen and R is selected from the group consisting of methyl, ethyl, propyl and butyl;
   injecting water through said conduit into the subterranean formation surrounding said well;
   injecting a suitable drying agent through said well conduit to dry said conduit;
   injecting said composition through the well conduit, into the subterranean formation surrounding the well;
   said composition reacting with the water in situ in said formation to form a mixture of two acids, RCOOH and HX, which mixture is effective to chemically react with formation materials to increase the permeability of the formation.

8. The process in accordance with claim 7 wherein said acid halide is acetyl chloride.

9. The process in accordance with claim 7, wherein water and said composition are alternatively injected through said well conduit.

10. A process for chemical treatment of high-temperature wells having a conduit therein, comprising drying said conduit and thence injecting acetyl chloride composition therethrough into the subterranean formation surrounding the well bore, said composition reacting with the water in situ in said formation to form a mixture of hydrochloric and acetic acids which is effective to increase the permeability of the formation.

* * * * *

UNITED STATES PATENT OFFICE
CERTIFICATE OF CORRECTION

PATENT NO. : 3,938,593
DATED : February 17, 1976
INVENTOR(S) : Robert H. Friedman It is certified that error appears in the above-identified patent and that said Letters Patent are hereby corrected as shown below:

Column 4, line 28, "anhydride" should read "halide".

Signed and Sealed this twenty-fifth Day of May 1976

[SEAL]

Attest:

RUTH C. MASON
Attesting Officer

C. MARSHALL DANN
Commissioner of Patents and Trademarks